(12) United States Patent
Hung

(10) Patent No.: US 11,962,700 B2
(45) Date of Patent: Apr. 16, 2024

(54) MULTI-TIER ENCRYPTION NON-FUNGIBLE TOKEN SYSTEM

(71) Applicant: NUFIAT TECHNOLOGIES LIMITED, Hong Kong (CN)

(72) Inventor: Siu-Ying Patrick Hung, Hong Kong (CN)

(73) Assignee: NUFIAT TECHNOLOGIES LIMITED, Hong Kong (CN)

( * ) Notice: Subject to any disclaimer, the term of this patent is extended or adjusted under 35 U.S.C. 154(b) by 266 days.

(21) Appl. No.: 17/659,176

(22) Filed: Apr. 13, 2022

(65) Prior Publication Data

US 2022/0337414 A1    Oct. 20, 2022

Related U.S. Application Data

(60) Provisional application No. 63/201,174, filed on Apr. 16, 2021.

(51) Int. Cl.
| | |
|---|---|
| *H04L 29/06* | (2006.01) |
| *H04L 9/08* | (2006.01) |
| *H04L 9/32* | (2006.01) |
| *H04L 67/1097* | (2022.01) |
| *H04L 67/561* | (2022.01) |

(52) U.S. Cl.
CPC .......... *H04L 9/3213* (2013.01); *H04L 9/0825* (2013.01); *H04L 9/3236* (2013.01); *H04L 67/1097* (2013.01); *H04L 67/561* (2022.05); *H04L 2209/56* (2013.01)

(58) Field of Classification Search
CPC ... H04L 9/3213; H04L 9/0825; H04L 9/3236; H04L 67/1097; H04L 67/561; H04L 2209/56; H04L 9/083; H04L 63/06; H04L 65/612; H04L 65/756; H04L 65/80; H04L 2209/60; H04L 2209/76; H04L 9/14; H04L 9/50; H04L 63/0428; H04L 65/765
See application file for complete search history.

(56) References Cited

U.S. PATENT DOCUMENTS

| | | | | |
|---|---|---|---|---|
| 2021/0065070 | A1* | 3/2021 | Augustine | H04L 9/0643 |
| 2022/0138640 | A1* | 5/2022 | Augustine | G06F 21/16 |
| | | | | 705/5 |
| 2022/0210061 | A1* | 6/2022 | Simu | H04L 9/3247 |
| 2022/0337414 | A1* | 10/2022 | Hung | H04L 65/756 |
| 2022/0366494 | A1* | 11/2022 | Cella | H04L 9/50 |
| 2023/0117725 | A1* | 4/2023 | Quigley | G06Q 20/326 |
| | | | | 705/65 |

* cited by examiner

*Primary Examiner* — Mahfuzur Rahman
(74) *Attorney, Agent, or Firm* — EAGLE IP LIMITED

(57) ABSTRACT

In certain embodiments, one aspect provides a method of securely distributing multi-tier multimedia contents on the Internet, using Non-Fungible Token (NFT) Blockchain and comprising the steps of: signal processing data splitting phase, converting an original multimedia file into multiple data portions; access control encryption phase, converting each of the multiple data portions into an encrypted data portion and uploading the encrypted data portion to a storage cloud; access control storage phase, storing the encrypted data portion on the storage cloud; access control decryption phase, downloading the encrypted data portion from the storage cloud and reconstructing each of the encrypted data portions into each of said multiple data portions; and signal processing data merging phase, reconstructing appropriate multimedia data content depending on a user's tier level.

20 Claims, 12 Drawing Sheets

| Output files from a Signal Processing Data Splitter | | | | Tier Level |
|---|---|---|---|---|
| M0 | M1 | M2 | M3 | |
| Unavailable | Unavailable | Unavailable | Unavailable | Tier 0 |
| Available | Unavailable | Unavailable | Unavailable | Tier 1 |
| Available | Available | Unavailable | Unavailable | Tier 2A |
| Available | Unavailable | Available | Unavailable | Tier 2B |
| Available | Unavailable | Unavailable | Available | Tier 2C |
| Available | Available | Available | Unavailable | Tier 3A |
| Available | Available | Unavailable | Available | Tier 3B |
| Available | Unavailable | Available | Available | Tier 3C |
| Available | Available | Available | Available | Tier 4 |

FIG.2

MULTI-TIER ENCRYPTION NON-FUNGIBLE TOKEN SYSTEM

CROSS-REFERENCE TO RELATED APPLICATION

This application claims priority to, and the benefit of, U.S. Provisional Application Ser. No. 63/201,174 filed Apr. 16, 2021, entitled "Multi-tier Encryption Non-Fungible Token System". The entire contents of the foregoing application are hereby incorporated by reference for all purposes.

FIELD OF INVENTION

This invention generally relates to Non-Fungible Token (NFT) blockchain technology, and in particular to a multi-tier encryption Non-Fungible Token blockchain system thereof.

BACKGROUND OF INVENTION

Non-Fungible Tokens (NFTs) are arguably the best technology today to prove digital ownership. They cover a wide range of digital collectibles, from a tweet to a 3D movie. NFTs, which are based on a distributed blockchain technology, are extremely robust and can work reliably across country boundaries. Unfortunately, many NFTs do not provide actual benefits to their owners. Everyone, and not only the NFT owners, can access the same digital contents. As such, these NFTs are simply a bragging right and nothing more. It is therefore an object of this invention to design a new type of NFTs that can provide real benefits. These new NFTs can not only prove ownership but also provide exclusive access.

SUMMARY OF INVENTION

In the light of the foregoing background, a multi-tier encryption Non-Fungible Token system thereof is disclosed.

Accordingly, an exemplary embodiment is a method of securely distributing multi-tier multimedia contents on the Internet using a Non-Fungible Token (NFT) Blockchain and comprising the steps of: converting an original multimedia file into multiple data portions in the signal processing data splitting phase of the method; converting each of the multiple data portions into an encrypted data portion to generate a plurality of encrypted data portions and uploading the plurality of encrypted data portions to a storage cloud in the access control encryption phase of the method; storing the plurality of encrypted data portions on the storage cloud in the access control storage phase of the method; downloading and decrypting the plurality of encrypted data portions from the storage cloud to generate a plurality of decrypted data portions, and to reconstruct said multiple data portions of the original multimedia file based on the plurality of decrypted data portions in the access control decryption phase of the method; and reconstructing an appropriate multimedia data content from the multiple data portions of the original multimedia file depending on a user's tier level in the signal processing data merging phase of the method.

The present invention has benefits and advantages over conventional technology. For example, not only can the present system prove ownership but also provide exclusive access. This new type of NFTs can support multiple tiers, with different benefits available at different tiers.

One implementation of this new NFT class is to apply public-key infrastructure (PKI) encryption method to the digital content. In this case, the digital content is encrypted and only the NFT owners can access the digital content using their private keys. However, this approach is far from satisfactory. For example, potential NFT buyers may want to preview the content before purchasing. This implementation cannot easily support multiple types or tiers of legitimate users.

Another implementation is to use an authentication server to check the status of each user. For example, a NFT potential buyer is allowed to preview a snippet of the content, and the NFT owner is allowed to enjoy the best multimedia quality. Although this approach can work, it also suffers from some major shortcomings. First, it is very expensive to maintain the authentication servers in the long run. More importantly, this centralized server approach defeats the key security benefits of distributed blockchain technology.

To this end, a new class of NFTs is disclosed which uses both distributed encryption and distributed authentication technology to support a multi-tier encryption scheme. Unlike the typical cryptographic encryption, the multi-tier encryption scheme supports both lossless and lossy signal processing of the underlying multimedia data. The distributed encryption technology, coupled with efficient digital signal processing, provides a cost-effective solution for multi-tier user experience. Specifically, only a single copy of digital content is needed. The underlying blockchain technology, using a distributed ledger, can guarantee data integrity and accessibility.

BRIEF DESCRIPTION OF FIGURES

FIG. 2 is a table which shows an example of different tier levels in the Multitier Encryption NFT System (MENS).

DETAILED DESCRIPTION

Figure 1A:
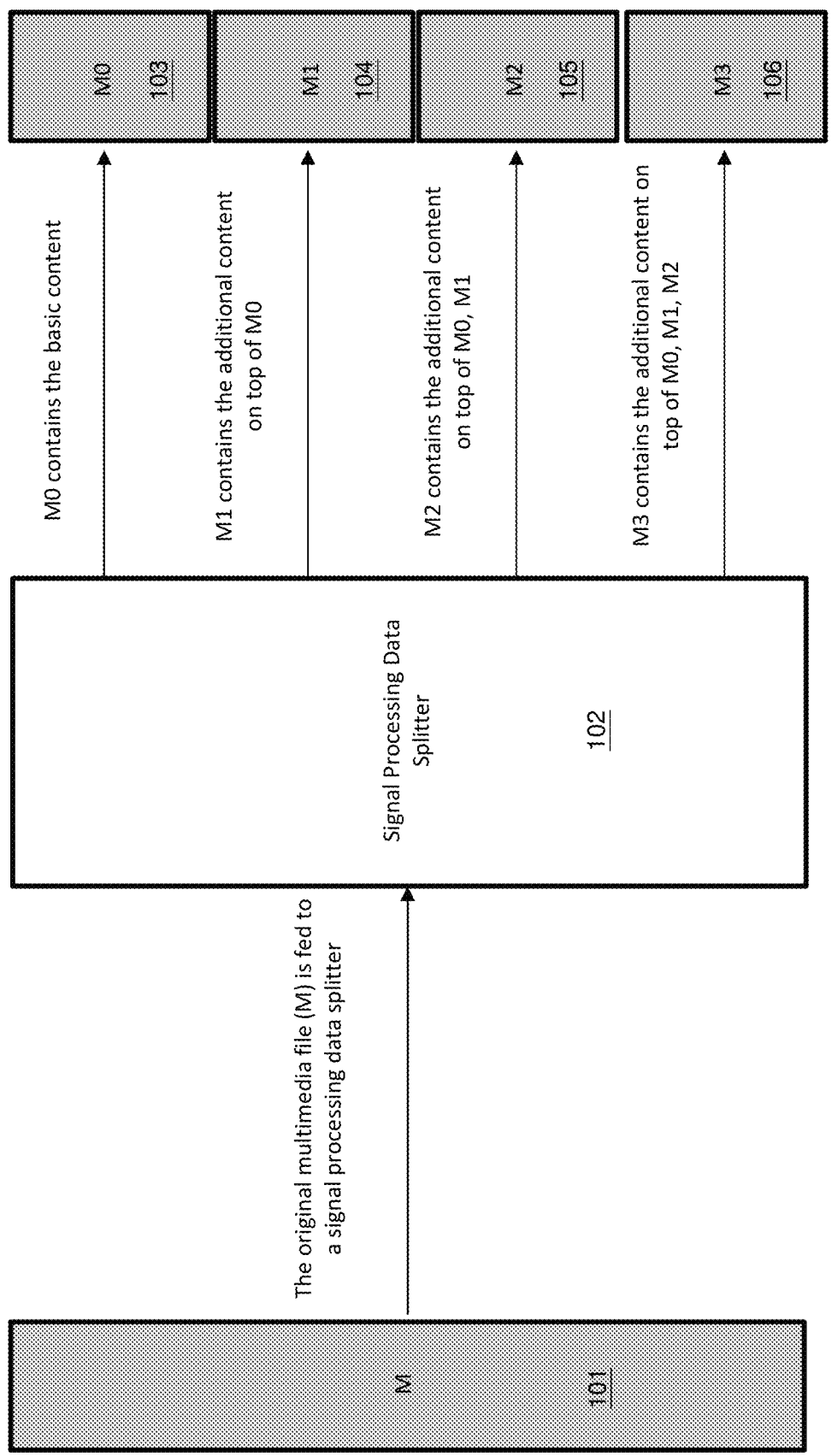
FIGS. 1A and 1B are diagrams which illustrate an example of the Signal Processing Data Splitter in the Multi-tier Encryption NFT System (MENS).

As used herein and in the claims, "comprising" means including the following elements but not excluding others. The term "based on" is to be read as "based at least in part on." The term "one example embodiment" and "an example embodiment" are to be read as "at least one example embodiment." The term "another embodiment" is to be read as "at least one other embodiment."

As used herein and in the claims, "server" means a software application running on a general purpose or dedicated computer hardware to provide a specific service to the multi-tier NFT system. For example, a "Content Provider Server" is a software application providing content service, a "Content Storage Server" provides content storage service to the entire system and a Key Generation Center Server maintains encryption keys and provides such service to the entire system, . . . , etc.

An exemplary embodiment is a method of securely distributing multi-tier multimedia contents on the Internet using a Non-Fungible Token (NFT) Blockchain and comprising the steps of: converting an original multimedia file into multiple data portions in the signal processing data splitting phase of the method; converting each of the multiple data portions into an encrypted data portion to generate a plurality of encrypted data portions and uploading the plurality of encrypted data portions to a storage cloud in the access control encryption phase of the method; storing the plurality of encrypted data portions on the storage cloud in the access control storage phase of the method; downloading and decrypting the plurality of encrypted data portions from the storage cloud to generate a plurality of decrypted data portions, and to reconstruct said multiple data portions of the original multimedia file based on the plurality of decrypted data portions in the access control decryption phase of the method; and reconstructing an appropriate multimedia data content from the multiple data portions of the original multimedia file depending on a user's tier level in the signal processing data merging phase of the method.

In some embodiments, the NFT Blockchain is based on Ethereum ERC-20, ERC-721, or ERC-1155 protocols.

In some embodiments, the signal processing data splitting phase and the signal processing data merging phase perform either lossy signal processing or lossless signal processing.

In some embodiments, the multimedia contents are high-resolution audio contents.

In some embodiments, the signal processing data splitting phase splits an original 96 kHz/24 bits high-resolution audio file into three separate data portions denoted as M0, M1 and M2.

In some embodiments, the signal processing data merging phase uses said M0, said M1 and said M2 to reconstruct different tiers of audio contents.

In some embodiments, the M0 contains 24 kHz/13 bits low-resolution audio content; the sum of said M0 and said M1 contains 48 kHz/16 bits medium-resolution audio content; the sum of said M0, said M1 and said M2 contains 96 kHz/24 bits high-resolution audio content.

In some embodiments, the access control encryption phase uses a symmetric encryption algorithm to protect the multimedia data contents and uses an asymmetric encryption algorithm to protect one or more symmetric encryption keys which are used by the symmetric encryption algorithm.

In some embodiments, the symmetric encryption algorithm is AES.

In some embodiments, the asymmetric encryption algorithm is a one-to-many proxy re-encryption algorithm.

In some embodiments, the asymmetric encryption algorithm uses at least one public key and at least one private key wherein the at least one public key and at least one private key are the respective public and private keys of the NFT Blockchain.

In some embodiments, the asymmetric encryption algorithm uses at least one public key and at least one private key wherein both of which are maintained by a Key Generation Center Server.

In some embodiments, a Content Provider Server performs the signal processing data splitting phase.

In some embodiments, the Content Provider Server and a Content Proxy Server perform the access control encryption phase.

In some embodiments, the Content Provider Server calculates a proxy re-encryption key for each authorized user and calculates an access control data tag for each of said multiple data portions of the original multimedia file.

In some embodiments, the Content Proxy Server performs conditional proxy re-encryption of encrypted symmetric keys based on the proxy re-encryption keys and the access control data tags provided by the Content Provider Server, and uploads encrypted audio data and proxy re-encrypted symmetric keys to a Content Storage Server.

In some embodiments, the Content Storage Server performs the access control storage phase.

In some embodiments, the Content Storage Server contains an authentication layer.

In some embodiments, a NFT Owner Client performs the access control decryption phase and the signal processing data merging phase.

In some embodiments, the NFT Owner Client further comprises a hardware authentication layer which only provides an analog output to a user but does not allow the user to access to internal digital contents.

A new class of non-fungible tokens (NFTs), known as the Multi-tier Encryption NFT System (MENS) is disclosed here. These NFTs can prove ownership and can allow each NFT owner to access different types of multimedia data contents depending on the owner's tier level.

With this disclosure—unlike conventional image, video and audio digital encoding and compression mechanisms—a single encoded record contains multiple possible reconstructions of varying degrees of similitude with respect to the original signal. Higher levels of similitude are restricted to a select individual or group of end-users. Lower levels of similitude are available to more end-users and can optionally be available to all end-users that have access to the encoded record.

The Multi-tier Encryption NFT System (MENS) encompasses five sequential phases:
  Signal processing data splitting phase,
  Access control encryption phase,
  Access control cloud storage phase,
  Access control decryption phase, and
  Signal processing data merging phase.

Signal Processing Data Splitting and Merging Phases (First and Last Phases)

In the signal processing data splitting phase, an original multimedia content M is divided into (n+1) data portions: M0, M1, M2, . . . , Mn where n is a non-negative integer. In the signal processing data merging phase, M0, M1, M2, . . . , Mn are used to reconstruct the original multimedia content M.

The signal processing data splitting phase may either be lossy or lossless. Similarly, the signal processing data merging phase may either be lossy or lossless.

Figure 1B:
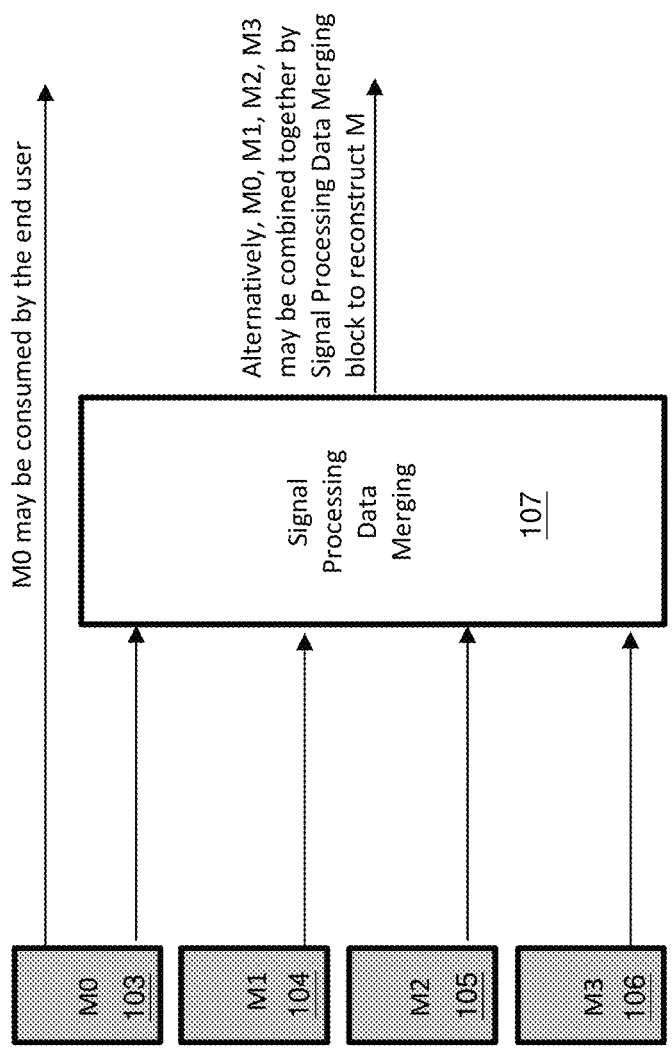

FIGS. 1A and 1B show an example of the Signal Processing Data Splitter 102 in the Multi-tier Encryption NFT System (MENS). In this example, n is 3, and a multimedia file (M) 101 may represent a high-resolution 3-D video file. M 101 is split into M0 103, M1 104, M2 105 and M3 106. M0 103 may represent a lower-resolution 2-D video file, M0 103+M1 104 may represent a medium-resolution 2-D video file, M0 103+M1 104+M2 105 may represent a high-resolution 2-D video file, and M0 103+M1 104+M2 105+M3 106 is equivalent to the original high-resolution 3-D video. Alternatively, M0 103 may also represent the first 30 minutes in the time domain, M1 104 may represent the second 30 minutes in the time domain, and so on. Using different types of time-domain and frequency-domain signal processing techniques, there are countless types of signal processing data splitting and merging.

In another embodiment, M0 103 contains the basic content, and M1 104, M2 105, M3 106 contain additional features. Combining M0 103, M1 104, M2 105, M3 106 may regenerate M 101. For example, the first portion may represent a low-resolution audio file, the second portion may be combined with the first portion to represent a higher-resolution audio file, and so on.

FIG. 2 shows different user tier levels in FIG. 1. M0, M1, M2, M3 are the different data portions generated in the data splitting phase. M0 contains the basic content, and M1, M2, M3 contain additional features. While each data portion may be independently enabled, not every possible combination makes sense. In this table, there are nine different tier levels and M0 is needed in eight of them. Tier 0 users cannot access any data, as none of M0, M1, M2, M3 is available; tier 4 users can access the full data content, as they can access M0, M1, M2, M3. The other tier levels are somewhere in-between. In general, there can be up to $2^{n+1}$ user levels, although not all these levels make sense. In this example, M0 is needed in all tier levels except tier level 0. As such, there are only 9 tier levels out of 16 possible combinations. Access Control Encryption, Storage, Decryption Phases (Second, Third and Fourth Phases)

Unlike most server-side access-control schemes, the Multi-tier Encryption NFT System (MENS) is primarily based on a distributed encryption technology. The multimedia contents are encrypted, uploaded to a storage cloud, and then downloaded and decrypted by the authorized users. This disclosure illustrates a scheme which ensures that the same encrypted data files may provide different qualities to different users depending on the corresponding NFT tier level. In this encryption-only scheme, no authentication server is required, and the maintenance costs are minimal.

Figure 3:
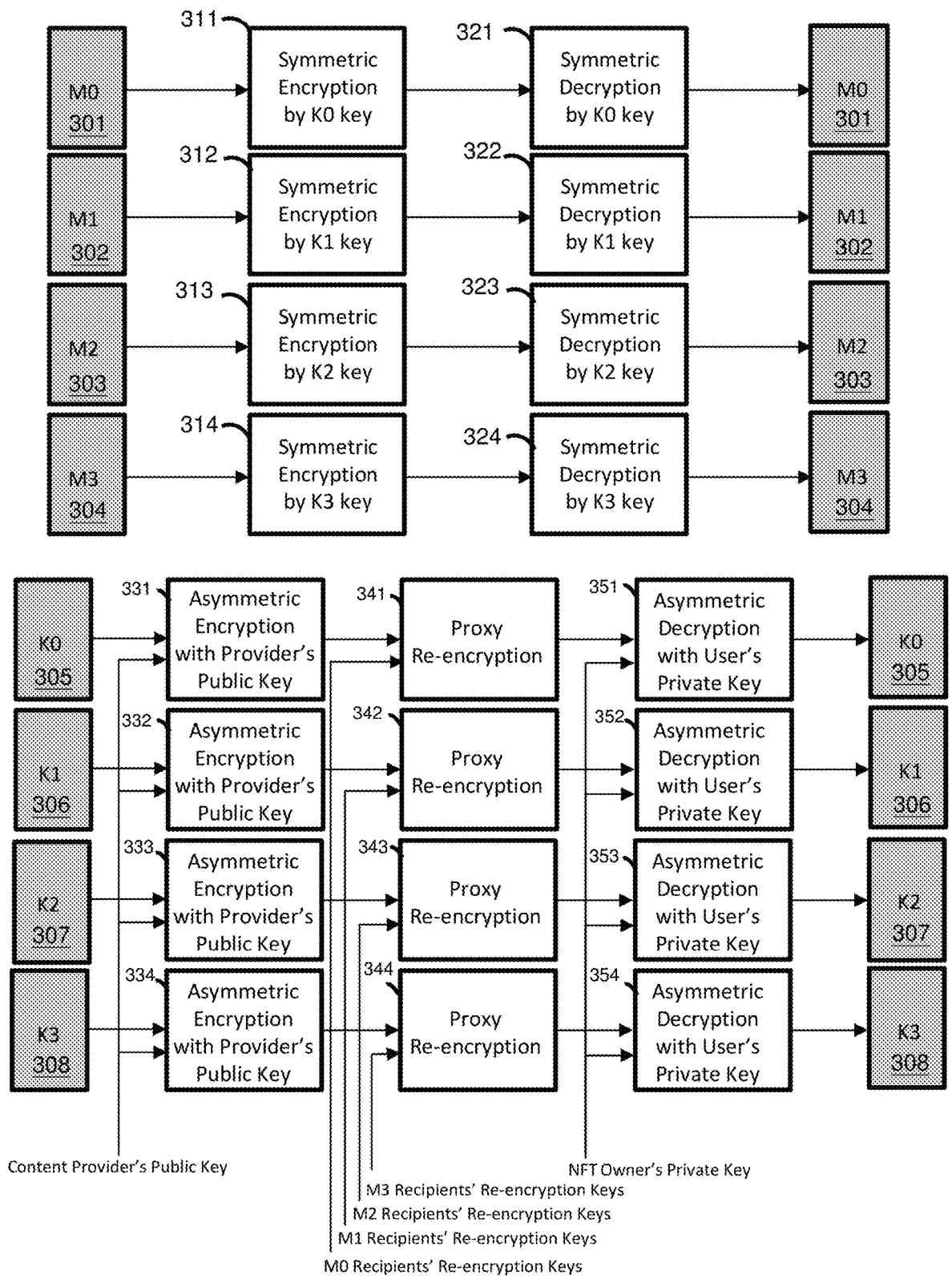
FIG. 3 is a diagram which shows that the split data portions (M0, M1, M2, M3) are encrypted using a symmetric algorithm, such as AES.

FIG. 3 shows how to control multimedia content using an encryption-only approach. In this figure, M0 301, M1 302, M2 303, M3 304 are encrypted symmetrically using random keys K0 305, K1 306, K2 307, K3 308 to produce the respective encrypted data portions (311 to 314). These encrypted data portions (311 to 314) are decrypted by the respective symmetric keys to generate the respective decrypted data portions (321 to 324). These random keys are in turn encrypted asymmetrically using the blockchain public and private keys. In one embodiment, these symmetric keys (K0 305, K1 306, K2 307, K3 308) are in turn encrypted using the public and private keys in the NFT blockchain. In particular, K0 305, K1 306, K2 307, K3 308 are encrypted (331-334) using the provider's public key, which are then re-encrypted (341-344) by a proxy server using the authorized recipients' re-encryption keys. The re-encrypted keys can be decrypted (351-354) by the authorized NFT owner by its own private keys.

In a further embodiment, a one-to-many proxy re-encryption algorithm is used, supporting the following features:

The one-to-many proxy re-encryption data sharing scheme is very efficient and cost effective when the same digital content may be shared among many different NFT owners.

In the above case, each NFT owners may have a different user tier. For example, one of the NFT owners may enjoy a 2-channel audio while another NFT owner may enjoy the surround sound version of the same music.

To provide additional IP protection, an optional authentication layer may be optionally added to the encryption-only scheme. Thus, there are two different types of access control in MENS:

Encryption-only access control, and

Encryption+authentication access control.

The optional authentication layer may be added to provide additional intellectual properties (IP) protection. Generally speaking, there are two different optional authentication layers:

A secure hardware authentication layer may be added on the client side. This hardware can ensure no digital content is externally available. Instead, the output of the client device is a proprietary hi-fi multimedia system with analog-only output. The digital contents and the private keys are located inside the secure device, so it may be exceedingly expensive for a hacker to steal the digital data.

A secure authentication layer may be added to the cloud storage. Only authorized users can get through and access the cloud content. While this approach may incur some maintenance costs, it can also provide added flexibility.

Another embodiment of this disclosure is related to a Multi-tier Encryption NFT System (MENS) for High-Resolution Audio. Specifically, a high-resolution audio file may have a 96 kHz sample rate with 24 bits resolution, whereas a CD quality audio file may have a 44.1 kHz or 48 kHz sample rate with 16 bits resolution.

The key benefit of this embodiment is to cost effectively distribute audio contents on the Internet with secure IP protection. This system does not require an authentication server. It allows NFT owners to enjoy the highest quality audio experience and at the same time allows other users to enjoy lower quality audio experience.

Figure 4:
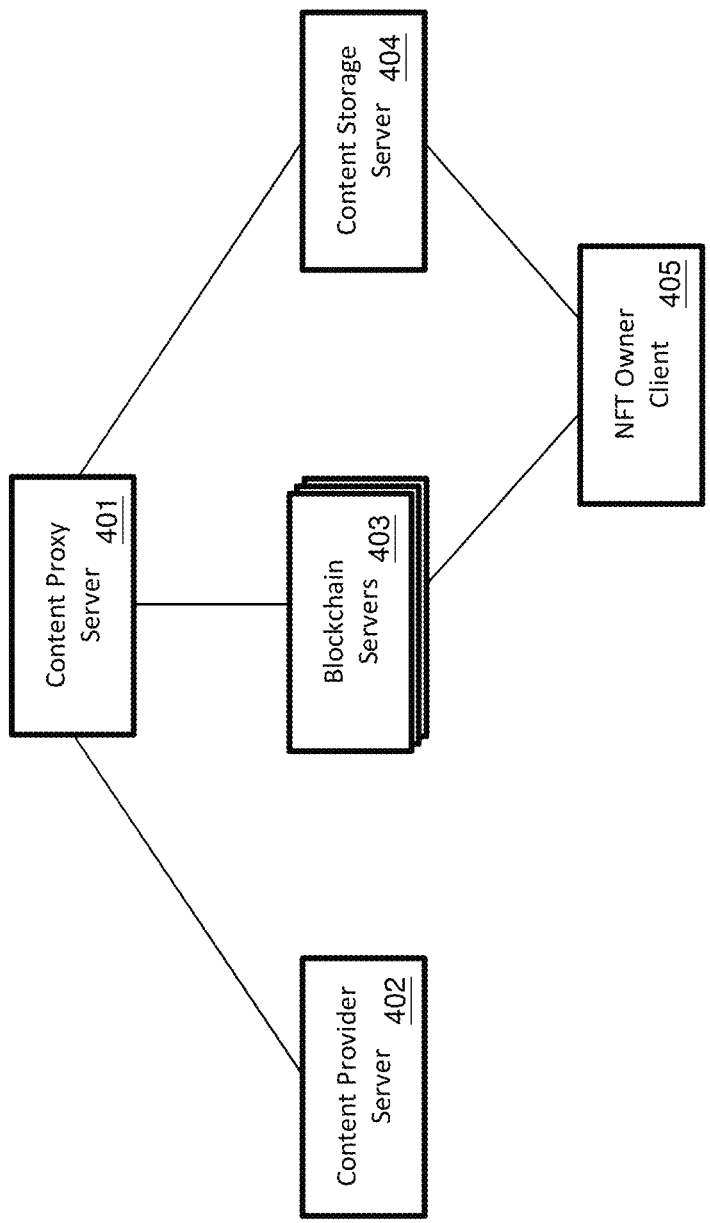
FIG. 4 shows a block diagram of the Multi-tier Encryption NFT System (MENS) highlighting the key data communication paths among the Content Provider Server, the Content Proxy Server, the Blockchain Servers, the Content Storage Server and the NFT Owner Client.

FIG. 4 shows the block diagram of the Multi-tier Encryption NFT System (MENS) in an alternative embodiment. It encompasses the following blocks:

The Content Provider Server 402 encrypts the audio files based on its blockchain public key obtained from the Blockchain Servers 403. It also generates an appropriate re-encryption key for every authorized Content Owner Client 405 at each tier level.

The Content Proxy Server 401 receives the encrypted audio files and the associated re-encryption keys from the Content Provider Server 402. It performs proxy re-encryption without access to the audio content.

The Content Storage Server 404 stores the encrypted audio files without access to the audio contents.

The Content Owner Client 405 downloads the encrypted audio files from the Content Storage Server 404 and decrypts the appropriate contents based on its tier level and its blockchain private key obtained from the Blockchain Servers 403.

The NFT blockchain, through the Blockchain Server 403, keeps track of the NFT owners and keeps track of the public keys of all the stakeholders in the Multi-tier Encryption NFT System (MENS).

Figure 5:
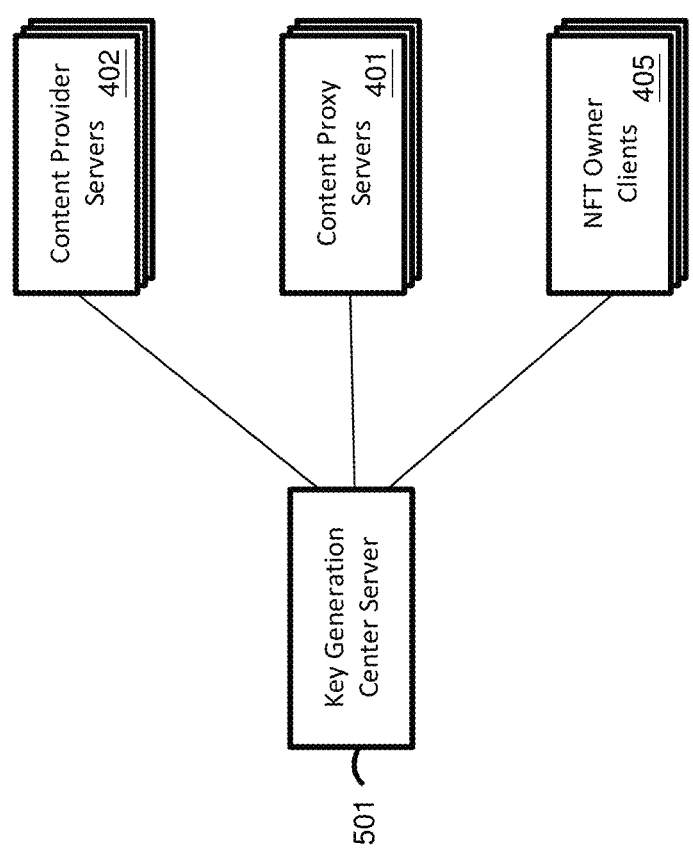
FIG. 5 shows a block diagram of an optional Key Generation Center Server used in the Multi-tier Encryption NFT Systems (MENS).

FIG. 5 shows a block diagram of an optional Key Generation Center Server used in the Multi-tier Encryption NFT Systems (MENS) in another embodiment of this invention. The public and private key management can be optionally maintained by a separate Key Generation Center (KGC) Server 501. In this embodiment, the public and private keys in the blockchain are not directly used. Instead, a separate server is used to maintain these keys, as shown in FIG. 5.

Figure 6:
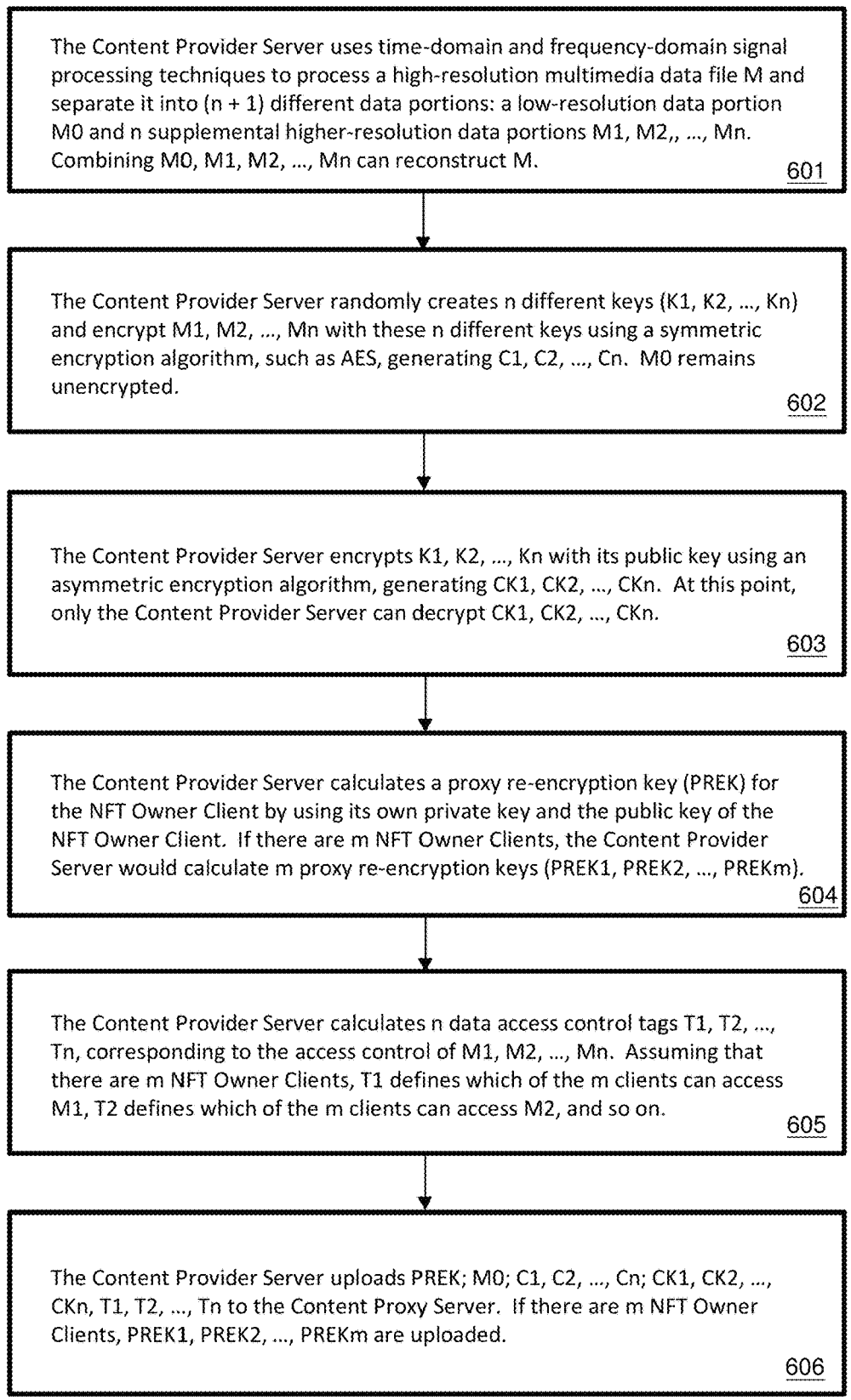
FIG. 6 shows a flow chart describing the processing steps to upload the encrypted data from the Content Provider Server to the Content Proxy Server in the Multi-tier Encryption NFT System (MENS).

FIG. 6 shows a detailed flowchart of the encryption processes performed by the Content Provider Server. On the abstract level, the Content Provider Server performs the following key tasks:

Signal processing data splitting of the high-resolution audio,

Generating random keys and using these random keys to encrypt each data portion using a symmetric encryption algorithm, such as AES, Generating proxy re-encryption keys for all the authorized NFT owners, based on the public keys of these owners.

For each split data portion (M0, M1, M2, . . . , Mn), calculate the corresponding access control data tag (T0, T1, T2, . . . , Tn) based on the tier level of every authorized NFT owner.

Uploading the encrypted data as well as the access control data tags to the Content Proxy Server.

In one example embodiment, the Content Provider Server performs the following key tasks:
in the step 601, the Content Provider Server uses time-domain and frequency-domain signal processing techniques to process a high-resolution multimedia data file M and separate it into (n+1) different data portions: a low-resolution data portion M0 and n supplemental higher-resolution data portions M1, M2, . . . , Mn. Combining M0, M1, M2, . . . , Mn can reconstruct M.

in the step 602, the Content Provider Server randomly creates n different keys (K1, K2, . . . , Kn) and encrypts M1, M2, . . . , Mn with these n different keys using a symmetric encryption algorithm, such as AES, generating C1, C2, . . . , Cn. M0 remains unencrypted.

in the step 603, the Content Provider Server encrypts K1, K2, . . . , Kn with its public key using an asymmetric encryption algorithm, generating CK1, CK2, . . . , CKn. At this point, only the Content Provider Server can decrypt CK1, CK2, . . . , CKn.

in the step 604, the Content Provider Server calculates a proxy re-encryption key (PREK) for the NFT Owner Client by using its own private key and the public key of the NFT Owner Client. If there are m NFT Owner Clients, the Content Provider Server would calculate m proxy re-encryption keys (PREK1, PREK2, . . . , PREKm).

in the step 605, the Content Provider Server calculates n data access control tags T1, T2, . . . , Tn, corresponding to the access control of M1, M2, . . . , Mn. Assuming that there are m NFT Owner Clients, T1 defines which of the m clients can access M1, T2 defines which of the m clients can access M2, and so on.

in the step 606, the Content Provider Server uploads PREK; M0; C1, C2, . . . , Cn; CK1, CK2, . . . , CKn, T1, T2, . . . , Tn to the Content Proxy Server. If there are m NFT Owner Clients, PREK1, PREK2, . . . , PREKm are uploaded.

Figure 7:
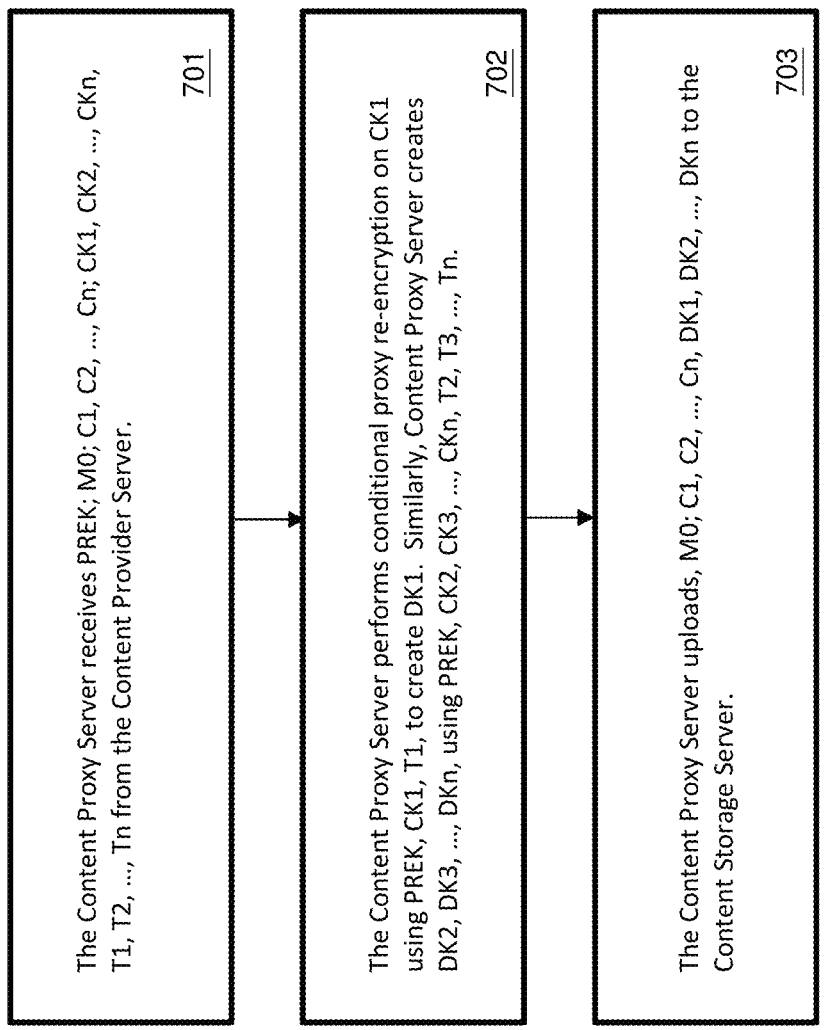
FIG. 7 shows a flow chart describing the proxy re-encryption process performed by the Content Proxy Server in the Multi-tier Encryption NFT System (MENS).

FIG. 7 shows the conditional proxy re-encryption processes performed by the Content Proxy Server. The re-encrypted data are then uploaded to the Content Storage Server. It is important to note that the Content Proxy Server cannot access the underlying audio contents even though it performs the re-encryption of these files. The Content Proxy Server also keeps track of the NFT owners.

In one example embodiment, the Content Proxy Server performs the following key tasks:
in the step 701, the Content Proxy Server receives PREK; M0; C1, C2, . . . , Cn; CK1, CK2, . . . , CKn, T1, T2, . . . , Tn from the Content Provider Server.

in the step 702, the Content Proxy Server performs conditional proxy re-encryption on CK1 using PREK, CK1, T1, to create DK1. Similarly, Content Proxy Server creates DK2, DK3, . . . , DKn, using PREK, CK2, CK3, . . . , CKn, T2, T3, . . . , Tn.

in the step 703, the Content Proxy Server uploads M0; C1, C2, . . . , Cn, DK1, DK2, . . . , DKn to the Content Storage Server.

Figure 8:
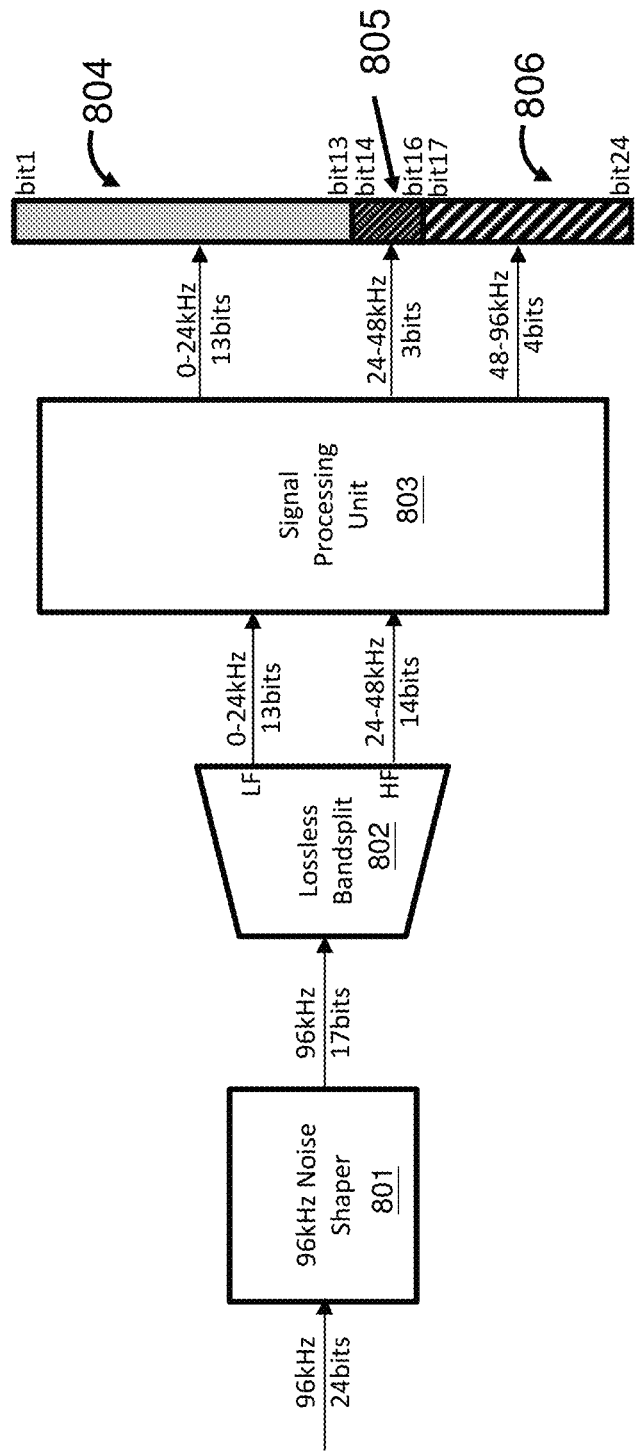
FIG. 8 shows a block diagram of a high-resolution audio encoder in one embodiment.

FIG. 8 shows an example of data splitting of the high-resolution audio. It comprises three main blocks: a 96 kHz Noise Shaper 801, a Lossless Bandsplit 802 and a Signal Processing Unit 803. The data input rate is 96 kHz/24 bits and data output rate may either be 44.1 kHz/24 bits or 48 kHz/24 bits. In this example, the original audio file (M) is split into three different data ports M0 (bit1-bit13) 804, M1 (bit14-bit 16) 805, and M2 (bit17-bit24) 806.

Figure 9:
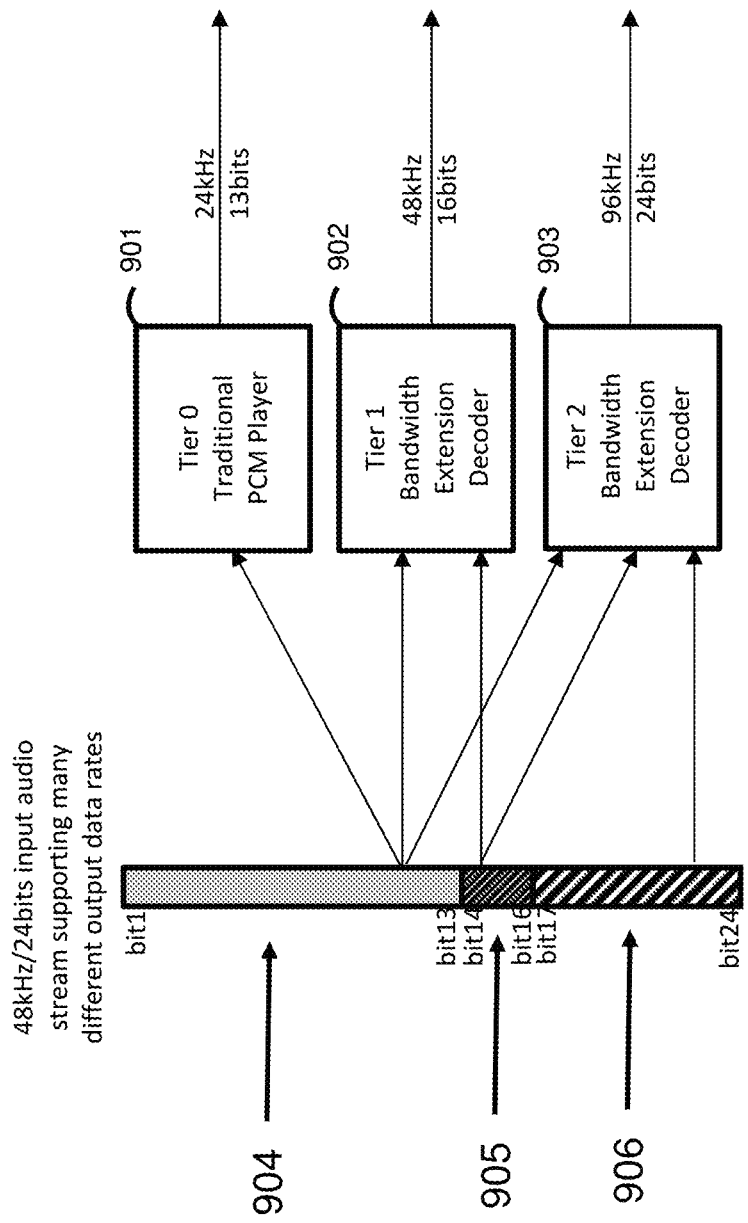
FIG. 9 shows a block diagram of a 48 kHz/24 bits audio data stream with three compatible audio decoders in one embodiment.

FIG. 9 shows how the split data portions can be used to reconstruct the high-resolution audio. In this example, the audio file (M) is split into M0 904, M1 905, and M2 906. M0 904 corresponds to a medium-quality audio file; M0 904+ M1 905 corresponds to a high-quality audio file; and combining M0 904, M1 905 and M2 906 together corresponds to the highest-quality audio file.

As an example, this figure shows a block diagram of a 48 kHz/24 bits audio data stream with three compatible audio decoders which are traditional PCM player 901, bandwidth extension decoder 902 and bandwidth extension decoder 903. The output data rate depends on the type of audio decoder. In this figure, there are three different data output rates: 24 kHz/13 bits, 48 kHz/16 bits and 96 kHz/24 bits. Besides these three data rates, 24 kHz/16 bits output rate is also possible, although it is not shown in this diagram FIG. 10 shows a data flow diagram describing the encryption (1002 and 1003), decryption (1004 and 1005) or no encryption (1001) of a high-resolution audio file in the Multi-tier Encryption NFT System (MENS).

Figure 10:
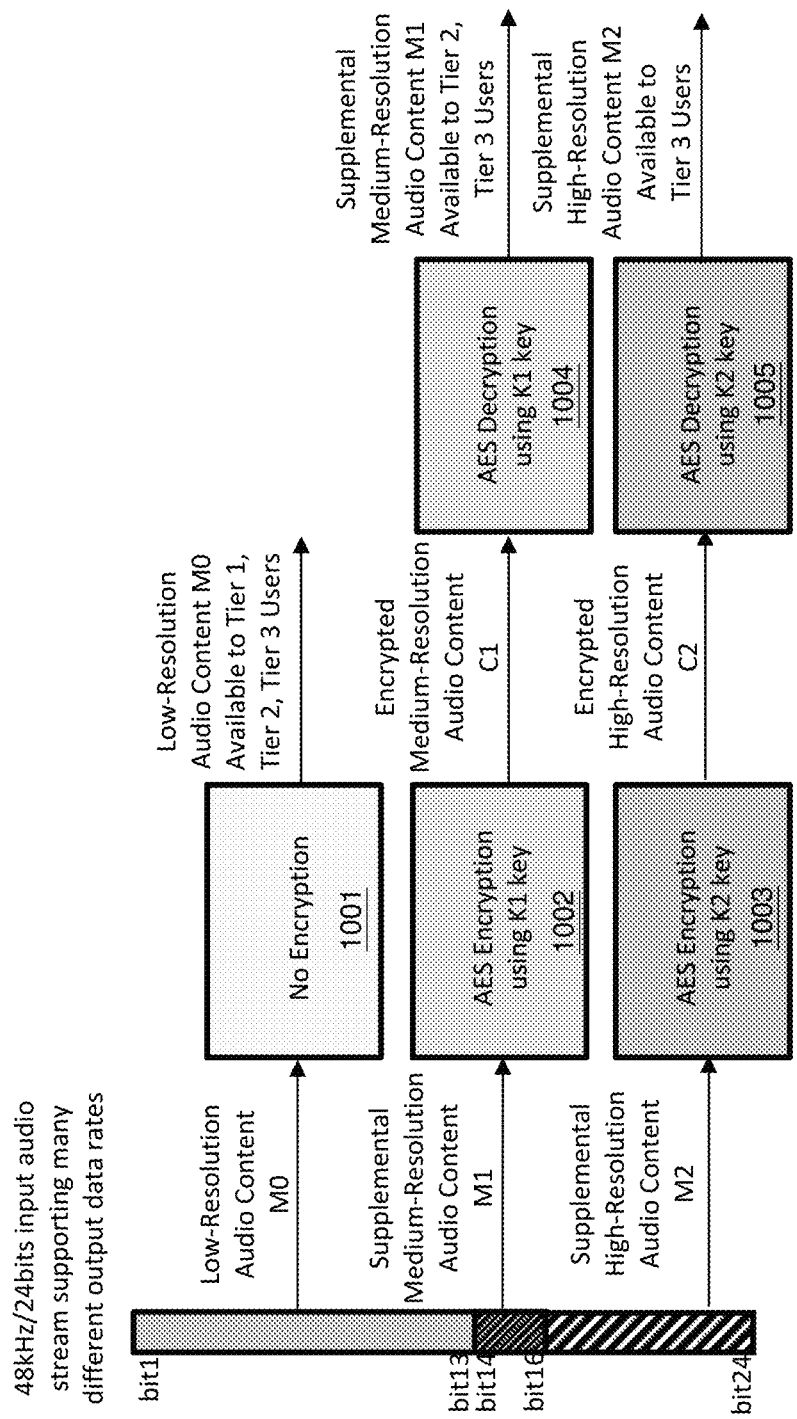
FIG. 10 shows a data flow diagram describing the encryption and decryption of a high-resolution audio file in the Multi-tier Encryption NFT System (MENS).
Figure 11:
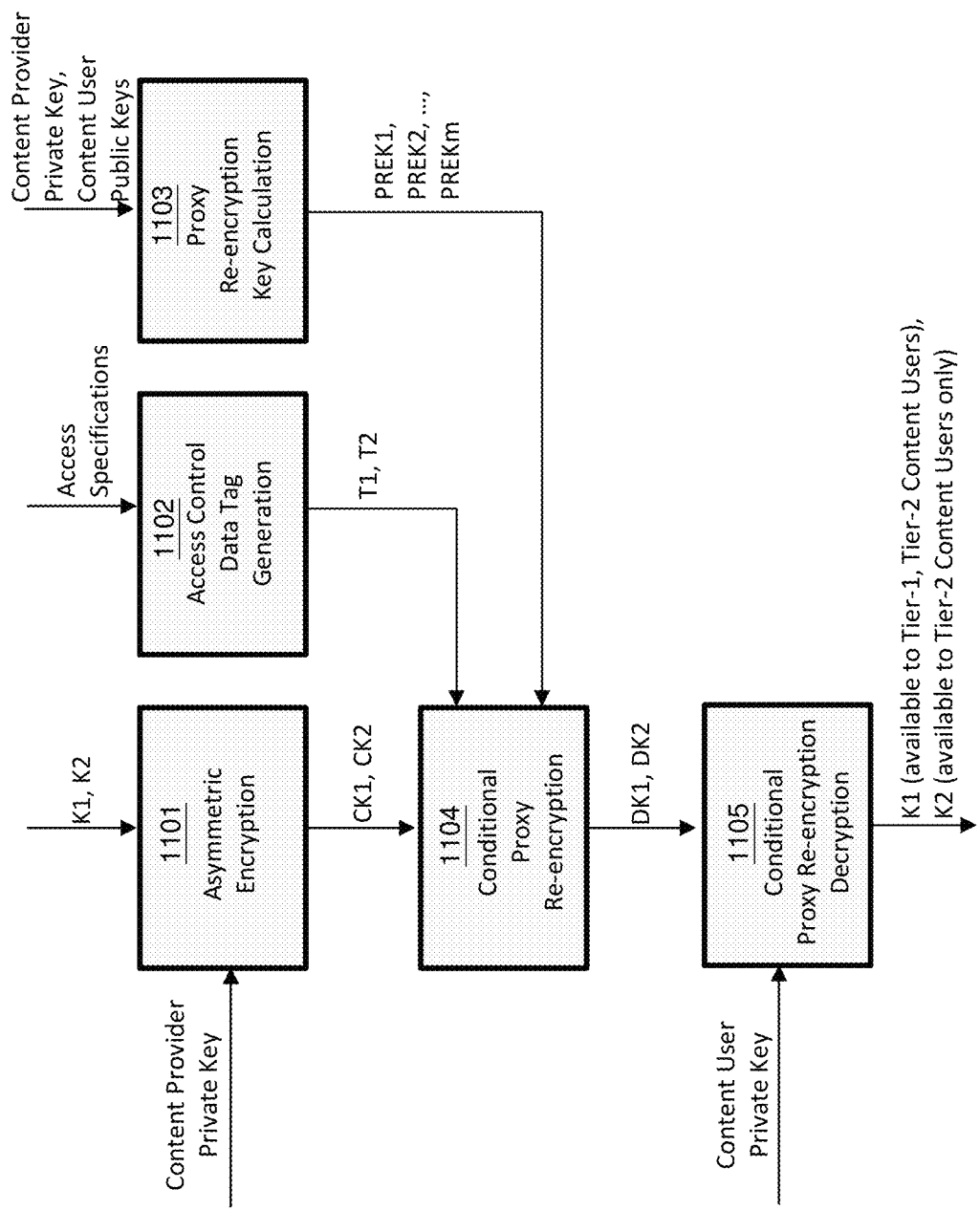
FIG. 11 shows a data flow diagram describing the proxy re-encryption of the symmetric keys K1, K2 used in one embodiment of the Multi-tier Encryption NFT System (MENS).

The encryption and decryption of K1, K2 is shown in FIG. 11. While FIG. 10 summarizes the symmetric encryption flow of audio data, FIG. 11 summarizes the asymmetric encryption of the symmetric keys K1 and K2.

FIG. 11 shows a data flow diagram describing the proxy re-encryption of the symmetric keys K1, K2 used in the Multi-tier Encryption NFT System (MENS) example in FIG. 10. The Content Provider Server first encrypts K1 and K2 with its private key to generate CK1 and CK2 at the Asymmetric Encryption process 1101. Form different content users, the Content Provider Server uses the content users' public keys to calculate m proxy re-encryption keys (PREK1, PREK2, . . . , PREKm) using the Proxy Re-encryption Key Calculation process 1103. The Content Provider Server reads the content users' access specifications to configure the access control data tags T1 and T2 when executing the Access Control Data Tag Generation process 1102. The Content Provider Server performs conditional proxy re-encryption algorithm using CK1, CK2, T1, T2 and PRE1, PREK2, . . . , PREKm to calculate DK1 and DK2 when performing Conditional Proxy Re-encryption process 1104. All content users can read DK1 and DK2.

While both tier-1 and tier-2 content users may use their private keys to decrypt K1, only tier-2 content users may use their private keys to decrypt K2 at the Conditional Proxy Re-encryption Decryption process 1105.

The exemplary embodiments of the present invention are thus fully described. Although the description referred to particular embodiments, it will be clear to one skilled in the art that the present invention may be practiced with a variation of these specific details. Hence this invention should not be construed as limited to the embodiments set forth herein.

For example, during the decryption process, the NFT Owner Client downloads the re-encrypted audio data from the Content Storage Server and uses its private key to decrypt the data. For additional IP protection, authentication servers may be added to the Content Storage Server, the NFT Owner Client, or both. The Content Storage Server may employ different authentication schemes, such as Google FIDO. The NFT Owner Client may reside in a EAL5+ crypto wallet.

Moreover, as far as the Non-Fungible Token (NFT) blockchain is concerned, there are many different possible implementations. In one embodiment, the NFT is implemented using Ethereum ERC-721 smart contract protocol. In another embodiment, the NFT is implemented using both Ethereum ERC-20 and ERC-721 smart contracts. In yet another embodiment, the NFT is implemented using the Ethereum ERC-1155 smart contract protocol.

Methods discussed within different figures can be added to or exchanged with methods in other figures. Further, specific numerical data values (such as specific quantities, numbers, categories, etc.) or other specific information should be interpreted as illustrative for discussing example embodiments. Such specific information is not provided to limit example embodiment.

What is claimed is:

1. A method of securely distributing multi-tier multimedia contents on the Internet using a Non-Fungible Token (NFT) Blockchain and comprising the steps of:
    converting an original multimedia file into multiple data portions in the signal processing data splitting phase of the method;
    converting each of the multiple data portions into an encrypted data portion to generate a plurality of encrypted data portions and uploading the plurality of encrypted data portions to a storage cloud in the access control encryption phase of the method;
    storing the plurality of encrypted data portions on the storage cloud in the access control storage phase of the method;
    downloading and decrypting the plurality of encrypted data portions from the storage cloud to generate a plurality of decrypted data portions, and to reconstruct said multiple data portions of the original multimedia file based on the plurality of decrypted data portions in the access control decryption phase of the method; and
    reconstructing an appropriate multimedia data content from the multiple data portions of the original multimedia file depending on a user's tier level in the signal processing data merging phase of the method.

2. The method according to claim 1, wherein the NFT Blockchain is based on Ethereum ERC-20, ERC-721, or ERC-1155 protocols.

3. The method according to claim 1, wherein the signal processing data splitting phase and the signal processing data merging phase perform either lossy signal processing or lossless signal processing.

4. The method according to claim 3, wherein the multimedia contents are high-resolution audio contents.

5. The method according to claim 4, wherein the signal processing data splitting phase splits an original 96 kHz/24 bits high-resolution audio file into three separate data portions denoted as M0, M1 and M2.

6. The method according to claim 5, wherein the signal processing data merging phase uses said M0, said M1 and said M2 to reconstruct different tiers of audio contents.

7. The method according to claim 6, wherein the M0 contains 24 kHz/13 bits low-resolution audio content; the sum of said M0 and said M1 contains 48 kHz/16 bits medium-resolution audio content; the sum of said M0, said M1 and said M2 contains 96 kHz/24 bits high-resolution audio content.

8. The method according to claim 1, wherein the access control encryption phase uses a symmetric encryption algorithm to protect the multimedia data contents and uses an asymmetric encryption algorithm to protect one or more symmetric encryption keys which are used by the symmetric encryption algorithm.

9. The method according to claim 8, wherein the symmetric encryption algorithm is AES.

10. The method according to claim 9, wherein the asymmetric encryption algorithm is a one-to-many proxy re-encryption algorithm.

11. The method in claim 10, wherein the asymmetric encryption algorithm uses at least one public key and at least one private key wherein the at least one public key and at least one private key are the respective public and private keys of the NFT Blockchain.

12. The method in claim 10, wherein the asymmetric encryption algorithm uses at least one public key and at least one private key wherein both of which are maintained by a Key Generation Center Server.

13. The method according to claim 1, wherein a Content Provider Server performs the signal processing data splitting phase.

14. The method according to claim 13, wherein the Content Provider Server and a Content Proxy Server perform the access control encryption phase.

15. The method according to claim 14, wherein the Content Provider Server calculates a proxy re-encryption key for each authorized user and calculates an access control data tag for each of said multiple data portions of the original multimedia file.

16. The method according to claim 15, wherein the Content Proxy Server performs conditional proxy re-encryption of encrypted symmetric keys based on the proxy re-encryption keys and the access control data tags provided by the Content Provider Server, and uploads encrypted audio data and proxy re-encrypted symmetric keys to a Content Storage Server.

17. The method according to claim 16, wherein the Content Storage Server performs the access control storage phase.

18. The method according to claim 17, wherein the Content Storage Server contains an authentication layer.

19. The method according to claim 18, wherein a NFT Owner Client performs the access control decryption phase and the signal processing data merging phase.

20. The method according to claim 19, wherein the NFT Owner Client further comprises a hardware authentication layer which only provides an analog output to a user but does not allow the user to access to internal digital contents.

* * * * *